United States Patent [19]

Iwata et al.

[11] 4,029,835

[45] June 14, 1977

[54] HEAT RESISTANT SHEET

[75] Inventors: Hiroshi Iwata; Mikio Yoshida, both of Ohtake, Japan

[73] Assignee: Mitsubishi Rayon Co., Ltd., Tokyo, Japan

[22] Filed: Jan. 14, 1976

[21] Appl. No.: 649,147

[30] Foreign Application Priority Data

Jan. 16, 1975 Japan ................................ 50-7327

[52] U.S. Cl. ................................ 428/212; 428/288; 428/296; 428/474; 428/910

[51] Int. Cl.$^2$ ................................ B32B 7/00

[58] Field of Search .................... 264/184; 156/244; 428/288, 290, 296, 302, 474, 212, 910

[56] References Cited

UNITED STATES PATENTS

| | | | |
|---|---|---|---|
| 3,414,645 | 12/1968 | Morgan | 264/184 |
| 3,574,811 | 4/1971 | Jamison | 264/184 |
| 3,595,951 | 7/1971 | Lugullo | 264/211 |
| 3,642,706 | 2/1972 | Morgan | 264/184 |
| 3,671,542 | 6/1972 | Kwolek | 260/30.8 R |
| 3,767,756 | 10/1973 | Blades | 264/184 |
| 3,801,545 | 4/1974 | Hunzel | 264/184 |
| 3,869,429 | 3/1975 | Blades | 264/184 |

*Primary Examiner*—James J. Bell
*Attorney, Agent, or Firm*—Armstrong, Nikaido & Marmelstein

[57] ABSTRACT

A novel heat resistant sheet having excellent varnish impregnability, a high dielectric strength and a high physical strength is obtained by pressing and heating a mixed web of wholly-aromatic polyamide fibers [A] having tan $\delta$ (max) 0.25 and Es < 130 g/d and wholly-aromatic polyamide fibers [B] having tan $\delta$ (max) 0.2 and Es 130 g/d under such conditions as said fibers [A] being heat fused.

7 Claims, No Drawings

HEAT RESISTANT SHEET

BACKGROUND OF THE INVENTION

The present invention relates to a heat resistant sheet comprising wholly-aromatic polyamide fibers alone and the object of the present invention is to provide a novel heat resistant sheet having good impregnability with various varnishes, excellent dielectric strength and a high physical strength.

Conventionally, synthetic heat resistant sheets having paper structure have been used in electrical apparatuses, especially electric motor, generator, etc. having a dry insulating constitution and in this case the sheets have been subjected to calendering treatment for making the paper surface dense to prevent decrease in dielectric strength which is caused by pinholes. As the result, the varnish impregnability is decreased in an insulating system in which use of an insulating varnish is essential and dielectric strength is reduced and life of the apparatuses is also decreased. Therefore, various proposals have been made for improving impregnability of sheet with insulating varnishes by examination of paper making conditions, but sufficient improvement has not yet been attained.

SUMMARY OF THE INVENTION

The inventors have made attempts to solve said defects caused in paper making process and have made intensive researches on development of insulating sheet materials for insulating system which comprises composite constitution of the sheet and insulating varnish and as the result they accomplished the present invention.

That is, the gist of the present invention resides in a heat resistant sheet obtained by subjecting a mixed web of wholly-aromatic polyamide fibers [A] having a maximum loss tangent tan $\delta$(max) 0.25 and a sonic modulus Es < 130 g/d and wholly-aromatic polyamide fibers [B] having tan $\delta$(max) 0.2 and Es 130 g/d to pressing and heating treatments under such condition that said fibers [A] cause heat fusion and the principle of the invention resides in that the fibers [B] having a tan $\delta$(max) of not more than 0.2 contribute to the strength of the sheet and the fibers [A] having a tan $\delta$(max) of not less than 0.25 act as a binder. Since the fibers [A] specified in the present invention are higher in molecular chain mobility than the fibers [B] and are softened and heat fused with shrinkage under suitable pressing and heating conditions, the fibers [A] effectively act for formation of a sheet having voids effective for varnish impregnation under coexistence of the fibers [B] which are much lower in heat deformation than the fibers [A]. In this case, even the fibers having a tan $\delta$(max) of not less than 0.25, if they are high in degree of orientation, become conspicuously higher in crystallizing velocity under heating than the fibers which are low in degree of orientation and are rapidly hardened due to the crystallization whereby they cannot exhibit heat fusion action. Therefore, in order to give heat fusion function to such fibers, it is necessary to prevent the rapid crystallization and a tan $\delta$(max) of not less than 0.25 and an Es of less than 130 g/d are required for this purpose. Furthermore, in order to allow the sheet to have a strength required for practical use, it is necessary to use the fibers [B] together with the fibers [A]. The fibers [B] which are to be a skeleton of the sheet must be such that are sufficiently oriented and crystallized and hardly undergo deformation even by the heat fusion treatment by which the fibers [A] are deformed and for this purpose, the fibers [B] are required to have a tan $\delta$(max) of not more than 0.2 and an Es of not less than 130 g/d.

The term "wholly-aromatic polyamide" used herein means aromatic polyamide in which more than 80 mol % of repeating units is m-phenyleneisophthalamide and which is obtained by polycondensation of metaphenylenediamine and/or other aromatic diamines as an amine component and isophthalic acid and other aromatic dibasic acid or its derivative as an acid component. Examples of the aromatic diamines used besides metaphenylenediamine are para-phenylenediamine, benzidine, 4,4'-diaminodiphenyl ether, 4,4'-diaminodiphenyl sulfon, etc. As the acid component, acid halides which are highly active derivatives are generally used and examples of suitable aromatic dibasic acid halides are, besides isophthalic acid chloride, terephthalic acid chloride, 1,4-naphthalene dicarboxylic acid chloride, 2,6-naphthalene dicarboxylic acid chloride, 4,4'-biphenyl carboxylic acid chloride, 3-chloroisophthalic acid chloride, bis(para-chlorocarbonyl phenyl) ether, etc.

As the polymer solution for spinning, a solution for a polymerization reaction may be directly used or the solution may be once added to water or other poor solvent to precipitate a polymer, which is redissolved after dried.

Examples of suitable solvents are organic solvents such as N,N-dimethylformamide, N,N-dimethylacetamide, N-methylpyrrolidone, dimethyl sulfoxide, hexamethylphosphoro amide, tetramethylurea, etc. or these organic solvents to which inorganic salts such as lithium chloride, calcium chloride, etc. are added for improving the solubility, or inorganic solvents such as sulfuric acid, hydrogen fluoride, fuming sulfuric acid, chlorosulfuric acid, polyphosphoric acid, etc. The polymer concentration in the solution varies depending on copolymer compositions, polymerization degree and spinning method, but is preferably about 5 – 25% by weight. Thus obtained wholly-aromatic polyamide solution is spun by either one of dry spinning, wet spinning or dry jet-wet spinning and then the resultant fibers are passed for desolvation through washing baths during which time they are stretched and oriented. The fibers at this stage are low in crystallinity and nearly amorphous in X-ray analysis, but degree of orientation of the fibers measured by sonic velocity method increases with increase in stretching ratio. Then, said fibers are dried and thereafter are heat treated at a temperature of higher than the glass transition temperature, e.g., higher than 280° C, for example, 280° – 350° C under tension in the case of poly-metaphenyleneisophthalamide. At this step, the fibers are crystallized and the structure is set and at the same time degree of orientation is increased.

The inventors have found that tan $\delta$(max) and Es of the fibers obtained by said method are greatly influenced by stretching ratio and heat treating conditions and behavior of the fibers with heat is well regulated in accordance with the correlation between said two values and as the result they have accomplished the present invention.

According to the present invention, a web is formed by mixing fibers [A] having a tan $\delta$(max) of not less than 0.25 and an Es of less than 130 g/d and fibers [B] having a tan $\delta$(max) of not more than 0.2 and an Es of not less than 130 g/d which can be obtained by suitably adjusting the conditions for producing the fibers and in this case the fibers [A] and [B] are not required to have the same composition and use of a copolymer as the fibers [A] provides good result especially for increasing the heat fusibility. A suitable example is use of a copolymer obtained by polycondensation of isophthalic acid chloride/terephthalic acid chloride = 90/10 (molar ratio) and metaphenylenediamine as the fibers [A] and use of polymeta-phenyleneisophthalamide as the fibers [B]. The mixing ratio of the fibers [A] and the fibers [B] is suitably 1:4 – 4:1. When the amount of the fibers [A] is too small, the heat fusibility is insufficient and it becomes difficult to mold the fibers into a sheet and when the amount of the fibers [B] is too small, strength of the resultant sheet is insufficient to be used. Thus obtained mixed web is formed into a sheet by heating under pressure by means of hot press, hot roll, etc. The pressing and heating conditions are set preferably for obtaining a void ratio of the sheet of 30 – 70%. When the void ratio is less than 30%, varnish impregnability is insufficient and when the void ratio is more than 70%, retention of the varnish solution is insufficient. The desired void ratio can be easily obtained usually under the conditions of 200° – 350° C and not more than 200 kg/cm². Thus obtained sheet comprises only aromatic polyamide and hence is excellent in heat resistance, is high in strength, and has suitable void ratio and excellent varnish impregnability. Thus, this sheet can be used as an excellent heat resistant insulating material after being impregnated with varnish.

The methods for measuring the values of main properties in the present invention are shown below. Maximum loss tangent tan δ(max):

This is the value of main dispersion peak in temperature dispersion of loss tangent (tan δ) measured at a constant frequency of 110 Hz/sec and a heating rate of 2° C/min with use of VIBRON DDV 2 (manufactured by Toyo Sokki K.K.).

Sonic modulus Es:

The propagation velocity V km/sec of sound wave of 10 KHz/sec through a sample is measured by VIBRON DDV 5 (manufactured by Toyo Sokki K.K.) and Es is calculated from $Es = 11.34 \times V^2$ (g/d).

Relative viscosity ηrel:

With use of a capillary viscometer, the falling time ($t_{solv}$ second) of a concentrated sulfuric acid (higher than 95% by weight) at 30° C and the falling time ($t_{soln}$ second) of the solution of 1 g polymer/100 ml concentrated sulfuric acid are measured and the relative viscosity is calculated from the formula $\eta rel = t_{soln}/t_{solv}$ Void ratio:

When a mean value of specific gravity of the fibers which constitute the sheet is defined as $\rho_f$ and apparent specific gravity of the sheet is as $\rho_a$, the void ratio is expressed by the formula:

$$\text{Void ratio} = (\rho_f - \rho_a)/\rho_f \times 100\ (\%)$$

Dielectric breakdown voltage:

This is measured with AC voltage in accordance with the method specified in JIS C-2111.

EXAMPLE 1

A polymer solution containing 20% by weight of poly-meta-phenyleneisophthalamide having a relative viscosity of 3.8 which was prepared by solution polymerization of m-phenylenediamine and isophthalic acid chloride in dimethylacetamide, 9.1% by weight of calcium chloride and 3% by weight of water was dry spun using a nozzle having 200 holes of 0.15 mm in diameter to obtain unstretched filaments. The unstretched filaments were passed for washing through the water baths of 90° during which time they were stretched at stretching ratios of 2, 3, 4 and 5 times and dried to obtain tows A, B, C and D and tows E, F, G and H which were obtained by further heat treating said tows A, B, C and D at 330° C under tension (stretching ratio 1.1 times). The single fiber size of the fibers which constituted the tows A – H was adjusted to 2 deniers by varying the size of the unstretched filaments. The properties of the fibers which constituted said tows are shown in Table 1.

Table 1

| Tow | tan δ (max) | Es (g/d) | tenacity (g/d) | Elongation (%) |
|---|---|---|---|---|
| A | 0.42 | 61 | 1.7 | 150 |
| B | 0.37 | 86 | 2.5 | 83 |
| C | 0.30 | 93 | 3.3 | 49 |
| D | 0.26 | 139 | 3.5 | 21 |
| E | 0.29 | 118 | 2.8 | 36 |
| F | 0.20 | 122 | 3.1 | 15 |
| G | 0.18 | 150 | 4.5 | 29 |
| H | 0.17 | 175 | 5.1 | 17 |

Crimps were given to said tows and the tows were cut to 50 mm in length. These were subjected to carding step to obtain webs, which were pressed and heated at 300° C and 120 kg/cm² to obtain sheets of 30 g/m² in basis weight and about 1.5 mils in thickness. Impregnability of these sheets with varnish was good. Properties and electric characteristics of these sheets impregnated with silicone resin varnish are shown in Table 2.

Table 2

| Experiment No. | Combination | Strength of sheet (kg/mm²) | Void ratio (%) | Uniformity of sheet | Dielectric breakdown voltage (KV/0.1mm) |
|---|---|---|---|---|---|
| 1 | A-F | 1.8 | 60 | x | 6.1 |
| 2 | A-G | 4.2 | 51 | o | 8.3 |
| 3 | A-H | 4.8 | 47 | o | 7.9 |
| 4 | B-F | 2.1 | 56 | x | 5.7 |
| 5 | B-H | 4.7 | 45 | o | 7.4 |
| 6 | C-G | 4.3 | 47 | o | 6.6 |
| 7 | D-G | 2.1 | 42 | x | 5.1 |
| 8 | E-H | 5.2 | 38 | | 5.5 |

In the above Table, the uniformity of the sheet was judged by observation with the naked eyes. The symbol *o* means "good," Δ means "somewhat bad" and *x* means "bad." In this Table, experiments No. 2, 3, 5, 6 and 8 indicate the sheets of the present invention which had high strength and good dielectric breakdown voltage. Experiments No. 1, 4 and 7 are comparative examples which were good in varnish impregnability and dielectric breakdown voltage, but were low in strength.

EXAMPLE 2

A polymer solution containing 20% by weight of wholly-aromatic polyamide having a relative viscosity of 3.5 which was prepared by solution polymerization of m-phenylenediamine and isophthalic acid chloride/-terephthalic acid chloride = 90/10 (molar ratio) in dimethylacetamide, 9.1% by weight of calcium chloride and 3% by weight of water was dry spun using a nozzle having 200 holes of 0.15 mm in diameter to obtain unstretched filaments. These filaments were stretched to 4 times and washed at the water baths of 90° C, and dried to obtain tow I having a single fiber size of 2 deniers. The properties of the fibers constituting said tow were as follows: tan δ(max) = 0.40, Es = 88 g/d, tenacity = 3.1 g/d and elongation = 110%. Crimps were given to said tow I and tow G obtained in Example 1 and then these tows were cut to 50 mm in length. They were mixed with each other in a mixing ratio of 50/50 (weight ratio). The mixture was subjected to carding step to form a web, which was pressed and heated at 300° C and 120 kg/cm² to obtain a sheet of 30 g/m² in basis weight and about 1.5 mils in thickness. This sheet had a void ratio of 53% and good impregnability with silicone resin varnish. The silicon resin varnish impregnated sheet had a strength of 4.5 kg/mm² and a dielectric breakdown voltage of 7.1 KV/0.1 mm.

EXAMPLE 3

A polymer solution containing 19% by weight of poly-meta-phenyleneisophthalamide having a relative viscosity of 3.7 was prepared by solution polymerization of m-phenylenediamine and isophthalic acid chloride in N-methylpyrrolidone. This polymer solution was diluted with N-methylpyrrolidone in an amount of 3 times the amount of the polymer solution. The diluted solution was added to a large amount of vigorously stirred water to precipitate the polymer, which was filtered off, washed with cold water several times and thereafter dried at 80° C under reduced pressure. The resultant polymer was dissolved in N-methylpyrrolidone to prepare a spinning solution having a polymer concentration of 22% by weight. This solution was wet spun into water containing calcium chloride and N-methylpyrrolidone using a nozzle having 6000 holes of 0.12 mm in diameter. The resultant filaments were continuously fed into water baths to remove remaining solvent and then were stretched to 3.2 times at a water bath of 90° C. Thereafter, the filaments were dried and then heat treated at 330° C under tension (stretching ratio 1.25 times) to obtain tow J having a single fiber size of 2 deniers. The fibers which constituted said tow had tan δ(max) = 0.19, Es = 160 g/d, tenacity = 4.5 g/d and elongation = 20%. Crimps were given to said tow J and tow A obtained in Example 1 and these were subjected to the same step as in Example 1 to obtain a sheet having a basis weight of 30 g/m² and a thickness of about 1.5 mils. This sheet had a void ratio of 62% and a good slicone resin varnish impregnability. The silicone resin varnish impregnated sheet had a strength of 4.2 kg/mm² and a dielectric breakdown voltage of 8.5 KV/0.1 mm.

EXAMPLE 4

Unstretched filaments were produced in the same manner as in Example 1 and they were sufficiently washed at a water bath of 90° C and dried to obtain tow K of unstretched fibers having a single fiber size of 3 deniers. The fibers which constituted said tow K had tan δ(max) = 1.55, Es = 46 g/d, tenacity = 0.8 g/d and elongation = 250%. Then, crimps were given to said tow K and the tow G obtained in Example 1 and thereafter they were cut to 50 mm in length and were mixed in a weight ratio 25/75 (= K/G). The mixture was subjected to carding step to form a mixed web, which was pressed and heated at 300° C and 120 kg/cm² to obtain a sheet having a basis weight of 30 g/m² and a thickness of 1.5 mils. Thus obtained sheet had a void ratio of 61% and was excellent in the silicone resin varnish impregnability. The sheet impregnated with the silicone resin varnish had a strength of 4.6 kg/mm and a dielectric breakdown voltage of 8.0 KV/0.1 mm.

EXAMPLE 5

The tow K obtained in Example 4 and the tow G obtained in Example 1 were cut to 15 mm in length and were dispersed in water in a mixing ratio (by weight) of 25/75 (= K/G). The dispersion was formed into a mixed web by an inclined former. The resultant mixed web was dehydrated and dried and then was pressed and heated at 300° C and 120 kg/m² to obtain a sheet having a basis weight of 50 g/m² and a thickness of 2 mils. This sheet had a void ratio of 55% and was excellent in silicone resin varnish impregnability. This sheet which was impregnated with the silicone resin varnish had a strength of 4.7 kg/mm and a dielectric breakdown voltage of 8.1 KV/0.1 mm.

What is claimed is:

1. A heat resistant sheet produced by pressing and heating a mixed web of wholly aromatic polyamide fibers [A] having a maximum loss tangent tan δ(max) 0.25 and a sonic modulus Es < 130 g/d and wholly-aromatic polyamide fibers [B] having a maximum loss tangent tan δ(max) 0.2 and a sonic modulus Es < 130 g/d at a temperature of from 200° to 350° C and a pressure of not more than 200 kg/cm² wherein said fibers [A] are heat fused.

2. A heat resistant sheet according to claim 1, wherein the wholly-aromatic polyamide of both the fibers [A] and [B] is polymetaphenyleneisophthalamide.

3. A heat resistant sheet according to claim 1, wherein the wholly-aromatic polyamide of the fibers [A] is a copolymer wherein at least 80 mol % of repeating unit is metaphenyleneisophthalamide and the wholly-aromatic polyamide of the fibers [B] is polymetaphenyleneisophthalamide.

4. A heat resistant sheet according to claim 3, wherein said copolymer is a polycondensate of isophthalic acid chloride/terephthalic acid chloride = 90/10 (in molar ratio) and metaphenylenediamine.

5. A heat resistant sheet according to claim 1, wherein the mixing ratio of the fibers [A] and the fibers [B] is 1:4 – 4:1.

6. A heat resistant sheet according to claim 1 which has a void ratio of 30 – 70%.

7. An insulating sheet comprising the heat resistant sheet according to claim 1, impregnated with an insulating varnish.

* * * * *